(12) United States Patent
Carvalho et al.

(10) Patent No.: US 9,442,994 B2
(45) Date of Patent: Sep. 13, 2016

(54) DATABASE, APPARATUS, AND METHOD FOR STORING ENCODED TRIPLES

(71) Applicant: FUJITSU LIMITED, Kawasaki-shi, Kanagawa (JP)

(72) Inventors: Nuno Carvalho, London (GB); Takahide Matsutsuka, London (GB)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 13/773,053

(22) Filed: Feb. 21, 2013

(65) Prior Publication Data

US 2013/0238667 A1    Sep. 12, 2013

(30) Foreign Application Priority Data

Feb. 23, 2012   (EP) ..................... 12156707

(51) Int. Cl.
*G06F 17/30* (2006.01)

(52) U.S. Cl.
CPC ... *G06F 17/30575* (2013.01); *G06F 17/30312* (2013.01); *G06F 17/30584* (2013.01); *G06F 17/30958* (2013.01)

(58) Field of Classification Search
CPC .............. G06F 17/30312; G06F 17/30575; G06F 17/30584; G06F 17/30958
See application file for complete search history.

(56) References Cited

U.S. PATENT DOCUMENTS

2004/0193653 A1*   9/2004  Howard et al. ............... 707/200
2006/0085412 A1*   4/2006  Johnson et al. ................ 707/4
2009/0265301 A1*  10/2009  Chen et al. ...................... 707/1

OTHER PUBLICATIONS

SPARQL Query Language for RDF, Jan. 15, 2008, pp. 1-90.*
D. Dominguez-Sal et al., "Survey of Graph Database Performance on the HPC Scalable Graph Analysis Benchmark", WAIM 2010 Workshops, LNCS 6185, pp. 37-48, Jul. 15, 2010.
Min Cai et al., "RDFPeers: A Scalable Distributed RDF Repository based on A Structured Peer-to-Peer Network", Proceedings of the 13th Conference on World Wide Web, pp. 650-657, Jan. 4, 2004.
European Search Report of EP 12 15 6707.7 mailed Oct. 1, 2012.

* cited by examiner

*Primary Examiner* — Jorge A Casanova
(74) *Attorney, Agent, or Firm* — Staas & Halsey LLP (57) ABSTRACT

A database of graph data encoded as triples, each including a subject, a predicate, and an object, and each stored within a data item of data items ordered according to their data and distributed across a plurality of nodes of a distributed network; where the node to which each of the data items is mapped is dependent upon the position of the item within the set; and each triple is stored in two or more items each having a different configuration from among the following: —a first in which the subject precedes the predicate and the object in the item; —a second in which the predicate precedes the subject and the object in the item; and —a third in which the object precedes the subject and the predicate in the item.

12 Claims, 6 Drawing Sheets

DATABASE, APPARATUS, AND METHOD FOR STORING ENCODED TRIPLES

CROSS-REFERENCE TO RELATED APPLICATIONS

This application claims the foreign priority benefit of European Application No. 12156707.7 filed Feb. 23, 2012, the disclosure of which is incorporated herein by reference.

The present invention is in the field of data storage. In particular, the embodiments of the present invention relate to the storage of triples describing graph data within a distributed storage environment.

Relational databases store data in rows and columns. The rows and columns compose tables that need to be defined before storing the data. The definition of the tables and the relationship between data contained on these tables is called a schema. A relational database uses a fixed schema. Graph databases represent a significant extension over relational databases by storing data in the form of nodes and arcs, where a node represents an entity or instance, and an arc represents a relationship of some type between any two nodes. In an undirected graph, an arc from node A to node B is considered to be the same as an arc from node B to node A. In a directed graph, the two directions are treated as distinct arcs.

Graph databases are used in a wide variety of different applications that can be generally categorized into two major types. The first type consists of complex knowledge-based systems that have large collections of class descriptions (referred to as "knowledge-based applications"), such as intelligent decision support and self learning. The second type includes applications that involve performing graph searches over transactional data (referred to as "transactional data applications"), such as social data and business intelligence. Many applications may represent both types. However, most applications can be characterized primarily as either knowledge-based or transactional data applications. Graph databases can be used to maintain large "semantic networks" that can store large amounts of structured and unstructured data in various fields. A semantic network is used as a form of knowledge representation and is a directed graph consisting of nodes that represent concepts, and arcs that represent semantic relationships between the concepts.

There are several types of graph representations. Graph data may be stored in memory as multidimensional arrays, or as symbols linked to other symbols. Another form of graph representation is the use of "tuples," which are finite sequences or ordered lists of objects, each of a specified type. A tuple containing n objects is known as an "n-tuple," where n can be any non-negative integer greater than zero. A tuple of length 2 (a 2-tuple) is commonly called a pair, a 3-tuple is called a triple, a four-tuple is called a quadruple, and so on.

The Resource Description Framework (RDF) is a general method for conceptual description or modeling of information that is a standard for semantic networks. The amount of RDF data that is available nowadays is growing and it is already impossible to store it in a single server. In order to be able to store and search large amounts of data, the data must be maintained in multiple servers. Adding, deleting and querying data must be done in a coordinated way, using algorithms and data structures specially tailored for distributed systems. It is desirable to store graph data in a way which enables computationally efficient querying, maintenance, and manipulation of the data.

Embodiments of the present invention provide a database of graph data encoded as triples, each comprising a subject, a predicate, and an object, and each stored within a data item among a set of data items ordered according to their data and distributed across a plurality of nodes of a distributed network of nodes; wherein the node to which each of the data items is mapped is dependent upon the position of the data item within the ordered set; and each triple is stored in two or more data items each having a different configuration from among the following:
  a first configuration in which the subject precedes the predicate and the object in the data item;
  a second configuration in which the predicate precedes the subject and the object in the data item; and
  a third configuration in which the object precedes the subject and the predicate in the data item.

To store such triples in a conventional (unsorted) system, such as a distributed key-value store (KVS), each triple has to be associated with a key. Storing triples in a regular (unsorted) KVS can lead to computationally intensive procedures if the system needs to execute long traversals on the stored data. Executing long traversals in an unsorted KVS is implemented by executing a get(key) operation for each singular triple stored in the KVS. Using the big O notation, this operation is O(K), where K is the number of keys that the client application needs to retrieve (a possibly large number when doing long traversals). For each get( ) operation, the system needs to:
  1. Send the request to one of the processes, P, running as part of the KVS;
  2. P execute a function to find the network node that holds the data, which may return, for example, Q;
  3. P forwards the request to Q;
  4. Q can reply directly to the client application, or use P as an intermediate;
  5. The above tasks are repeated K times.

This procedure is executed typically in 3 communication steps, sometimes in just 2 communication steps if the data is in P, K times. This procedure is intensive in terms of its usage of computing resources, in particular those used to traverse the data store each time to retrieve the individual keys.

In embodiments of the present invention, each triple (such as an RDF triple) is stored as a data item, for example, as a simple string object, and is unique in the graph, G. So all the information about G is kept in the data items. The triples are stored as (encoded in) data items in an ordered data set that is distributed through processes in network nodes in a distributed network environment (such as a peer-to-peer network environment). A process running on each node facilitates the storage of an ordered subset of the data items. The process and the network node running the process are referred to more or less interchangeably in this document, it being clear from the context when the former or the latter is exclusively intended. Embodiments of the present invention enable efficient querying procedures to be run on the data. For example, a procedure to retrieve a range of data items, between dmin and dmax (when placed in order), executes the following steps:
  1. A client application sends a request to one of the processes, A;
  2. A executes a mapping function, getting the node IDs (or labels) of the processes that contain one subset of the required data range (in an exemplary case the data items are evenly distributed and each process is responsible for storing a large number of data items). As an example, consider that the keys required by the client application are stored in processes A and B;

3. A broadcasts a sub-range request to retrieve each subset of the required data items, to itself, and to B;

4. Each process replies to A with the requested data items;

5. A gathers the results (maintaining their order) and replies to the client application.

It can be seen from the above example that embodiments of the present invention enable more efficient querying of data. Furthermore, steps do not need to be repeated per data item in the request, as is the case with conventional technology.

Graph data in embodiments of the present invention may be directional graph data, so that an arc from a first graph node to a second graph node is not considered to be the same as an arc from the second graph node to the first graph node. A semantic network is formed as a representation of knowledge or information, with graph nodes representing concepts such as an entity or an instance, and arcs representing semantic relationships between the concepts.

In embodiments of the present invention, graph data is encoded as a triple, which is a finite sequence or ordered list of three objects, each of a specified type.

Optionally, the triples may be Resource Description Framework (RDF) triples. Throughout this document, it should be understood that where specific references to "RDF triple(s)" are made, it is an exemplary form of triple, conforming to the RDF standard. Furthermore, references to "triple(s)" include the possibility that the triple in question is an RDF triple. Similarly, the RDF processors discussed elsewhere in this document are exemplary of processors used for interaction between the API wrapper and the stored data items.

The Resource Description Framework is a general method for conceptual description or modeling of information that is a standard for semantic networks. Standardising the modeling of information in a semantic network allows for interoperability between applications operating on a common semantic network. RDF maintains a vocabulary with unambiguous formal semantics, by providing the RDF Schema (RDFS) as a language for describing vocabularies in RDF.

The triples provide for encoding of graph data by characterising the graph data as a plurality of subject-predicate-object expressions. In that context, the subject and object are graph nodes of the graph data, and as such are entities, objects, instances, or concepts, and the predicate is a representation of a relationship between the subject and the object. The predicate asserts something about the subject by providing a specified type of link to the object. For example, the subject may denote a Web resource (for example, via a URI), the predicate denote a particular trait, characteristic, or aspect of the resource, and the object denote an instance of that trait, characteristic, or aspect. In other words, a collection of triple statements intrinsically represents directional graph data. The RDF standard provides formalised structure for such triples.

The distributed network of nodes may include a system of more than one distinct storage units in communication with one another. An exemplary communication paradigm is peer-to-peer (P2P), hence it may be that the distributed network of nodes is a peer-to-peer network of nodes. P2P is a distributed architecture that partitions tasks or workloads between peers. Peers (individual nodes or processes) are equally privileged, equipotent participants in the application. Each peer is configured to make a portion of its resources, such as processing power, disk storage or network bandwidth, directly available to other network participants, without the need for central coordination by servers or stable hosts. Peers can be considered to be both suppliers and consumers of resources, in contrast to a traditional client-server model where servers supply and clients consume. Advantageously, a P2P system can maintain large groups of nodes exchanging messages with a logarithmic communication cost.

In embodiments, for example those in which the object of the triple is complex, it may be that the object stored in the ordered data item is a universal unique ID (UUID) generated for that object. This option may be useful in embodiments used in implementation scenarios in which objects are large and hence their size reduces the efficiency of the range query procedure.

In embodiments of the present invention, the triple is stored in an ordered data item, so that a query which returns a data item enables the representation of the triple to be retrieved.

In embodiments of the present invention, data items may be ordered by the lexical order of a string object representing elements of the triple, the string object being the data item, or included in the data item. For example, the lexical order may be alphabetical order. It may be desirable in implementations of invention embodiments to query a set of data items by fixing either the subject, the predicate, or the object (or the UUID of the object) of the data items. In order to efficiently return the results of such queries, it is advantageous for two or more elements of the triple to be stored as the first element in a data item.

The data items being ordered enables comparisons between data items to be made and range queries to be executed. A range query between K1 and K2 (where K1<K2) is a query that returns the data items contained in the ordered set of data items that are greater than K1 and less than K2, according to some pre-defined ordering metric of the keys. Of course, the set of data items is split across the nodes (wherein the nodes are resources such as servers, or processes running on those servers) of a distributed network of nodes. In an exemplary embodiment, a range query is initiated by a processor such as an RDF processor on behalf of an application by sending the query to one of the nodes. The node is configured to calculate which other nodes have data items sought by the query, for example, by applying the logical representation of the data items to K1 and K2, and executing sub-range queries on those nodes. The node is then configured to gather the results (maintaining the order of the data items) and return them to the processor that invoked the query.

Optionally, each of one or more of the elements of the triple (an element being the predicate, the object, or the subject) is a Uniform Resource Identifier (URI). RDF and other triple formats are premised on the notion of identifying things (i.e. objects, resources or instances) using Web identifiers such as URIs and describing those identified 'things' in terms of simple properties and property values. In terms of the triple, the subject may be a URI identifying a web resource describing an entity, the predicate may be a URI identifying a type of property (for example, colour), and the object may be a URI specifying the particular instance of that type of property that is attributed to the entity in question, in its web resource incarnation. The use of URIs enables triples to represent simple statements, concerning resources, as a graph of nodes and arcs representing the resources, as well as their respective properties and values. An RDF graph can be queried using the SPARQL Protocol and RDF Query Language (SPARQL). It was standardized by the RDF Data Access Working Group (DAWG) of the World Wide Web Consortium, and is considered a key semantic web technology. SPARQL allows for a query to consist of triple patterns, conjunctions, disjunctions, and optional patterns.

Optionally, each of the data items may include a string object comprising the subject, the predicate, and the object of the corresponding triple.

Advantageously, a string object is universally readable and established routines for its comparison and other handling requirements exist. The database itself and applications accessing the database may have well-established routines for handling string objects. Furthermore, string objects are quick to search and compare (order).

The data items may be ordered according to alphabetical comparisons of the string objects.

Advantageously, databases functions such as searching, ranging, and other comparison functions are available which are optimised in terms of computational efficiency to compare the alphabetical content of string data objects. Hence embodiments ordering data items in this way are particularly efficient in terms of computational efficiency. In such embodiments, it may be that the data items are ordered according to the alphabetical order of their string objects. The data items may simply be string objects, or they may include other objects or data. A string is a sequence of alphanumeric symbols.

The data items discussed in this document may be stand-alone pieces of information. However, invention embodiments include implementations in which each of the data items is a key of a key-value pair within a key-value system (KVS).

Advantageously, storage of keys including a full triple within the key of a key-value system enables functions to be performed on the set of keys that return the full triple, rather than simply a link or identifier to where the triple might be found.

Being stored in the key of a key-value pair includes representing the elements of the triple as a string object which is itself the key of the key-value pair.

A key-value system (KVS), or key-value store, is a plurality of stored keys and values, with each key having an associated value to which it is mapped via a logical function or logical tree, for example a hash table or hash map. A hash table or hash map is a data structure that uses a hash function to map keys (identifying values) to their associated values. In embodiments of the present invention, a hash function may be used to transform a key into an identification of the node (storage resource) in the plurality of nodes forming the peer-to-peer network of nodes.

Embodiments may be provided in which the value of each of the plurality of key-value pairs includes additional information related to the triple stored within the key.

The technique described above, in which the entire triple, or the predicate and subject of an triple with a UUID of the object, is stored in the key of a key-value pair, advantageously enables the value of the key-value pair to be used to enhance functionality and usability of the database. The nature or precise contents of the value will depend on the particular embodiment and implementation details. The value may be a container (which includes a class of object called Container, adapted to store strings, software and other objects together) referenced via the key. Some exemplary contents of such a container are set out below.

As a simple example, in key-value pairs in which a UUID of the object is included in the string of the key, rather than a string representing the object itself, a string representing the object itself may be stored in the container.

As a further example, meta-data about the triple is stored in the value. Meta-data in this context is descriptive data about the information items in the triple. The key stores a triple, and the value stores information about that triple.

Optionally, in such an embodiment, the additional information is data made available to an application accessing the database in dependence upon the identity of the application.

Advantageously, such embodiments extend the functionality of the database by enabling an application-dependent aspect to the reading and/or writing of data in the database. The data is application-dependent data, and may be viewed and treated in the KVS as an opaque object. The value container may also include an API to set and retrieve the application-dependent data.

Optionally, in the KVS implementations described above, the additional information includes a list of applications registered to receive a notification when a read and/or write access is made to the RDF triple stored within the key-value pair. Furthermore, the additional information may include software code for execution by the node storing the container. For example, the software code may be stored and called in response to certain events, with arguments for the software code also stored in the container. For example, a value may store a block of software code as an update function. When an associated triple is updated, the update function is called, with a list of other triples and their locations as arguments. The list of other triples may have been produced by client applications adding triples to a list in the container associated with a particular event.

Advantageously, notifying applications when a read or write access is made to triple data enhances the level of interaction between the database and applications using the data stored therein. Maintaining a list of applications registered to receive notifications provides a mechanism by which the notifications can be administered.

The value of each key-value pair may include an application programming interface, API, enabling an application to register and/or unregister for said notifications. The software code for executing the notifications may also be stored in the container, as discussed above.

Advantageously, providing a formalised mechanism for applications to register and unregister for notifications enables the notification system to be adapted and modified to reflect the current profile of applications and the requirements of those applications, both of which are likely to be dynamic in their nature. Furthermore, the database may be configured so that a database administrator or other user can update or otherwise alter the API itself.

Optionally, in the KVS implementations described above, the value of each key-value pair includes an application programming interface, API, governing access to the additional information.

An API is a specification by which software components interact with one another. In this case, the API may include definitions of data structures within a container so that locations of particular pieces of information can be determined, frameworks for issuing write commands or read commands relating to the data, and definitions of data types within the additional information.

In an exemplary embodiment, each of the data items is mapped to a node using an ordered hash table.

Advantageously, a hash table provides a computationally efficient way of mapping data items to nodes. An ordered hash table uses a hash function to allocate a data item to a node based on the content of the data item.

In a key value system, a hash table or hash map is a data structure that uses a hash function to map identifying values, known as keys, to their associated values. Thus, a hash table can be said to implement an associative array. The hash function is used to transform the key into the index (the hash) of an array element (the storage location, also referred to as the slot or bucket) where the corresponding value is to be sought.

Optionally, in such a database, the ordered hash table uses a consistent hashing function.

Consistent hashing regulates the number of keys that need to be remapped in response to a change in the number of slots in which the associated values are stored. For example, consider a system where the keys and values associated with K keys are distributed among n−1 'peers' in a peer-to-peer system. Should a new peer join the system, only K in keys need to be remapped. In consistent hashing, when a new peer is added to the system, it takes an approximately equal share of stored keys from the other peers, and when a peer is removed, its keys are shared between the remaining peers.

Optionally, in the KVS implementations described above, the database is accessible by one or more other databases; and the additional information includes: a list of databases among the one or more other databases that contain information represented by the triple stored within the key-value pair; and for each of the listed databases, a connector that allows the information contained in the triple stored within the key-value pair to be updated by an application operating on that listed database.

Advantageously, in such an embodiment, the other databases may be relational databases that effectively behave as applications, or may be linked to the graph database via an application, which access and modify data in the graph database. Such embodiments provide a common, interoperable, machine-accessible data store whose schema can be modified easily without requiring re-coding of the entire database.

A connector may include a software library that is able to communicate with external data sources. As an example, a JDBC driver is a connector to a relational database. In this context, a connector also converts data from external sources format to triples (and vice versa).

In an embodiment of another aspect of the present invention, there is provided a computing apparatus configured to function as a node within a distributed network of nodes (such as a peer-to-peer network of nodes), the computing apparatus storing a subset of a database of graph data encoded as triples (such as RDF triples), each comprising a subject, a predicate, and an object, and each stored within a data item among a set of data items ordered according to their data and distributed across a plurality of nodes of the distributed network of nodes; wherein the node to which each of the data items is mapped is dependent upon the position of the data item within the ordered set; and each triple is stored in two or more data items each having a different configuration from among the following:
 a first configuration in which the subject precedes the predicate and the object in the data item;
 a second configuration in which the predicate precedes the subject and the object in the data item; and
 a third configuration in which the object precedes the subject and the predicate in the data item.

In an embodiment of another aspect of the present invention, there is provided a computer program which, when executed by a computing apparatus, causes the computing apparatus to function as the computing apparatus described above.

Preferred features of the present invention will now be described, purely by way of example, with reference to the accompanying drawings, in which.

Figure 1:
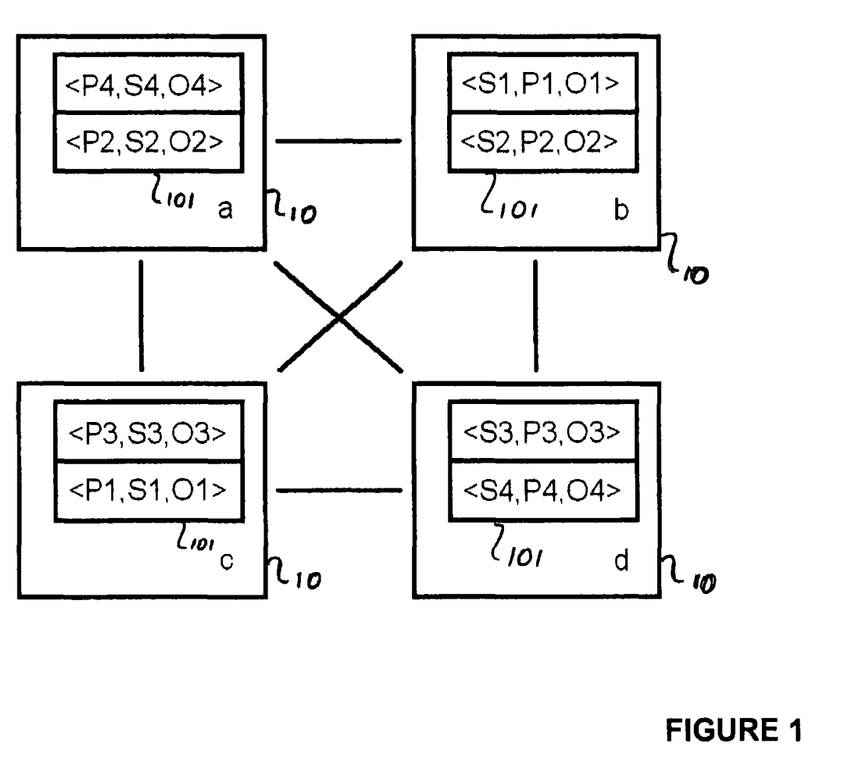
FIG. 1 is a schematic diagram of an embodiment of the present invention.

FIG. 1 is a schematic diagram representing an embodiment of the present invention. In the embodiment, there are four network nodes 10 forming a distributed network. In this particular embodiment, the communication paradigm employed is P2P, however the embodiment could function with other communication paradigms. The four network nodes are labelled a-d respectively. The labels are exemplary of network node addresses, and could of course be any data which enable the network nodes to be distinguished from one another. In the present embodiment, the network nodes can each be considered to be separate computers, such as storage servers. Each network node 10 has its own storage unit 101. However, it is possible that a single computing apparatus comprises more than one storage unit, each with its own address and being configured to be queried separately from the other. In such a case, it may be that the single computing apparatus is treated as more than one network node. The network nodes 10 can also be considered to be processes, wherein a process is simply a machine running some software to provide certain functionality.

The lines between the network nodes 10 represent data connections. The data connections may be hard-wired dedicated cabling running from one network node 10 to another, or they may be wireless connections, with channels or radio bearers established when required. Alternatively, the data connections may be realised via a network including cables, switches, wireless links, and other communication means. Each network node 10 may not have a data connection to each other network node 10. However, each network node 10 should be configured to be communicable with at least one another network node 10 so that each of the network nodes 10 can communicate with each other, even if it is via other network nodes 10 or other network equipment. In the embodiment depicted in FIG. 1, each of the network nodes 10 is provided with a data connection to each other network node 10.

Each network node 10 in the peer-to-peer network of the present embodiment stores two data items. Of course, invention embodiments are not limited by the number of network nodes in the peer-to-peer network (above a minimum of two), nor by the number of data items stored in each network node 10.

In the Figure, a data item is represented by a group of symbols between a pair of brackets < >. Each symbol is an alphanumeric pair, including a letter which denotes the type of triple element (P=predicate, S=subject, O=object) and a number which identifies the RDF triple being stored as the data item. These symbols are included to indicate how data might be stored, but not the actual content of the data that invention embodiments may store. In this embodiment, the triples are RDF triples, although embodiments of the present invention can encode graph data in other triple formats. So, there are four RDF triples 1, 2, 3, and 4. Each RDF triple is stored as two data items each having different configurations: one in which the subject precedes the predicate and object; and one in which the predicate precedes the subject and object.

The data items are mapped to network nodes 10 according to the type of RDF triple element that appears first in the data item, and according to the position of that data item among the set of data items established by comparing data items by a predetermined metric. For example, it may be that the metric is alphabetical order, and the subject of RDF triple 1 is "Adam", the subject of RDF triple 2 is "Acorn", the subject of RDF triple 3 is "Abdul", and the subject of RDF triple 4 is "Aaron". Therefore, it having been established by the mapping function that data items having the subject first will be stored across network nodes labelled b and d (and in the order, b then d), the data items are mapped to the network nodes as depicted in FIG. 1. The data items may be stored in order within a particular network node 10, or may be stored out of order but such that the order can be established, for example, in response to a query.

Incidentally, the mapping may be performed by a network node 10, by more than one of the network nodes in cooperation with one another, by a remote party, by a central mapping module, or in any other way. It may be that each of the network nodes 10 are configured to perform the mapping. The ordering metric used to compare each rdf triple element may be the same as one another, or different metrics may be used for different elements. In the embodiment of FIG. 1, it may be that the ordering metric used to compare predicates is length. So, assuming that the mapping function is configured to put the first subset of data items when ordered in the network node labelled c, and the second subset in the network node labelled a, P3 has the longest predicate, followed by P1, then P4, and finally, P2.

In the embodiment depicted in FIG. 1, there are an even number of data items in each of the network nodes labelled b and d. In preferred embodiments, each network node 10 stores an equal share or an approximately equal share of data items. However, embodiments of the present invention are not limited in this respect, and the mapping mechanism (or mapping function) may result in an uneven distribution of data items across network nodes.

Should an application wish to access graph data from the database, it may make a query in accordance with an API wrapper that formalises the format of queries to the database. For example, an application may query the database to retrieve a range of data items with subjects between "Acorn" and "Aaron" alphabetically.

The application sends the request to one of the network nodes 10. The network node receiving the request uses the mapping function to determine at which network nodes the highest-ordered data item having the subject "Acorn", and the lowest-ordered data item having the subject "Aaron" can be found. Based on the locations of the two extremes of the range, the locations of the whole of the range of data items can be determined. Hence the network node receiving the request broadcasts a sub-range request to the network node labelled b for the data item having the subject "Acorn" and any data items lower down the order. Only the data item illustrated as <S2,P2,O2> in FIG. 1 will be returned in this case. A sub-range request is also issued to the network node labelled d for the data item having the subject "Aaron" and any data items higher in the order. The data items illustrated as <S3,P3,O3> and <S4,P4,O4> will be returned in this case. The network node receiving the request is configured to respond to the application with the data items <S2,P2,O2>, <S3,P3,O3> and <S4,P4,O4>.

The computationally efficiency of the above query is better than that achieved with conventional graph data storage techniques. Furthermore, the efficiency savings increase for larger ranges in bigger and more widely-distributed data environments.

The storage system, that is, the interconnected network of storage units 101 on which the database is stored, employed in embodiments of the present invention is composed of a set of processes that communicate via a peer-to-peer (P2P) interface. The term "process" refers to a program that is running on a computer, and is hence equivalent to a network node 10 in the sense that a network node 10 may be configured to realise its functionality by running one or more programs, or processes. A process has its own memory address space and is configured to communicate with other processes through "sockets".

A triple is a simple data unit representing information in a graph. Depending on the implementation, triples may be small in size. A triple may represent information about, for example, a web resource. DBPedia is an online data store representing information about real-world entities. The following RDF triples are exemplary of the form in which triples may be stored in data items in embodiments of the present invention. The following RDF triples i)-iv) represent information about Aristotle (a real-world entity) stored as a web resource at http://dbpedia.org/resource/Aristotle.

| | |
|---|---|
| i) | "http://dbpedia.org/resource/Aristotle http://dbpedia.org/ontology/birthPlace http://dbpedia.org/resource/Stageira" |
| ii) | "http://dbpedia.org/resource/Aristotle http://purl.org/dc/elements/1.1/description \ "Greek philosopher\"@en" |
| iii) | "http://dbpedia.org/resource/Aristotle http://www.w3.org/1999/02/22-rdf-syntax-ns#type http://xmlns.com/foaf/0.1/Person" |
| iv) | "http://dbpedia.org/resource/Aristotle http://xmlns.com/foaf/0.1/name \"Aristotle\"@en" |

Each triple represents some information about Aristotle. For example, i) represents the Statement that the resource represented by the URI http://dbpedia.org/resource/Aristotle (the subject) has a link to another resource, the link defining a birthplace (the predicate), which is a relationship type defined at http://dbpedia.org/ontology/birthPlace, and the object linked to the subject by the "birthplace" relationship is the resource represented by the URI http://dbpedia.org/resource/Stageira. In other words, the triple i) represents the information that Aristotle is linked to Stageira as his birthplace. Similarly, triple ii) represents the information that the web resource . . . Aristotle (the subject) is linked to . . . "Greek Philosopher" (the object) as a description (the predicate). Triple iii) represents the information that the web resource . . . Aristotle (the subject) is a Person (the object) type of resource (predicate). Triple iv) represents the information that the web resource found at the URI . . . Aristotle (the subject) is linked to a string object "Aristotle" (the object) by the relationship "name" (the predicate).

Embodiments of the present invention store each triple in at least two configurations, each with a different triple element preceding the others. Therefore, the database can be queried in an efficient manner by queries based on at least two of the Subject, the Predicate and also the Object. The mechanism by which searches are implemented is by executing range queries on the set of data items which store the Triples. As a triple is in the generic form of <S,P,O>, searches can be made by fixing one (or more) elements of the triple. However, this is made more efficient if the triples can be ordered by more than one of the elements of the triple. For instance, if a client application wants to know all the information about the resource identified with the URL:

http://dbpedia.org/resource/Aristotle the range query received by a network node 10 of the embodiment will be a query to retrieve all the data items that have this subject as the first element. More generically, to execute a query, the range_query( ) procedure receives two keys that are comparable in lexical order: the lower bound and the upper bound. For the query of this particular example, the <S,P,O> encoding is efficient. The procedure will retrieve all the keys between the lower and the upper key. However, it may be that the query is to retrieve a list of all resources in the database having the resource identified with the URL:

http://dbpedia.org/resource/Stageira linked to it. Hence, the <S,P,O> encoding would not be efficient, since the identified URL is queried as an object, so data items having the same object would not be ordered consecutively with the <S,P,O> encoding. However, with the <O,P,S> encoding, for example, they would be. Hence, embodiments of the present invention widen the pool of queries that can be performed in a computationally efficient manner.

The triples are stored as (or encoded in) data items such that an order can be defined between data items, and this order is used to define a linear range of data between two end points. The linear range may be split into segments or subsets with each of more than one server or network node being responsible for the storage of a subset of the data. The mapping of data items to network nodes is logically organised by a mapping mechanism, for example a Trie (an ordered tree), which helps to efficiently retrieve which servers or network nodes are storing data items included in a range specified by a range query. After establishing a list of subsets required for a range query, it may be that the addresses of the servers storing those subsets are found using the mapping function for mapping data items to network nodes.

The order among the data items may be established by comparing the keys in lexical order. For instance, the String "Ka" is lower than the String "Kc". To be able to efficiently retrieve the results from a query by fixing its Subject <S, *, *>, its Predicate <*, P, *> or its Object <*, *, O>, all the three parts of the triple must be stored as the preceding element of the String in a data item. To be able to do this, the triple must be inserted in the KVS three times, using the following keys:

<S, P, 0>, <P, 0, S> and <0, S, P>

Storing triples three times in this way enables the database to execute any query with the same efficiency, regardless of the query type, and has the further benefit that the triple is naturally replicated, allowing reconstructing the information in case of failures. Of course, these benefits are not reliant on three versions of each triple being stored, and storing two versions of each triple would also yield some of the benefit. In a KVS embodiment, each version of the triple may link to the same value.

Figure 2:
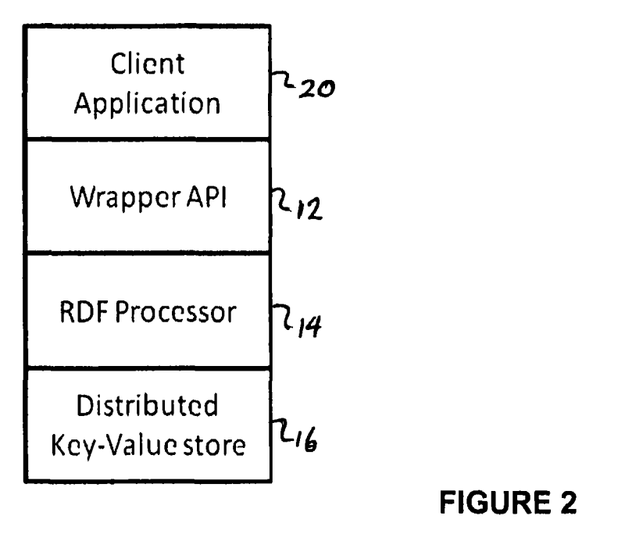
FIG. 2 is an exemplary system architecture implementing an embodiment of the present invention.

FIG. 2 illustrates an exemplary system architecture for embodiments of the present invention and their implementation in environments featuring client applications. FIG. 2 illustrates a layered system architecture of processes, which may be realised by programs running on one or more computers. For example, it is possible that the client application 20 will not run on the same computer as the wrapper API 12, the RDF processor 14, and the distributed key-value store 16. Of course, however they are distributed across one more machines, the processes include data connections to at least the adjacent processes in the system architecture invention.

The first layer is client application 20. The client application 20 is exemplary of a machine that may wish to access a database embodying the present invention. The client application 20 may be hosted in a cloud environment, in a server of a client:server architecture, or may be running on the machine of an end user. The client application 20 has some requirement to access the database, for example, to query the data stored therein.

The wrapper API 12 and RDF processor 14 may be provided as distinct processes, or may work together in a single process. The wrapper API 12 simplifies the interface by which the client application 20 access the RDF processor 14 and the distributed key-value store 16, for example, by providing functions that combine different aspects of the basic functions provided by other APIs in the system architecture. For example, REST can be used as an API wrapper 12 for the RDF processor 14. Therefore, in the system architecture of FIG. 2, the client application 20 interacts with the RDF processor 14 through a well-defined wrapper API 12. The wrapper API 12 may include interfaces to send queries to a SPARQL engine included in the RDF processor 14.

The RDF processor 14 may include a SPARQL engine that is configured to split a "complex query" received via the wrapper API 12 from the client application 20 into several simple range queries. RDF triple data is stored as a set of ordered data items across a network of nodes 10, as described above in relation to FIG. 1. In the system architecture of FIG. 2, a "Key-Value store" (KVS) is included as an example of such an ordered data set, with the data items of the FIG. 1 embodiment being stored as keys in the KVS. The database, including the KVS, is configured to store RDF triple data and to execute range queries on its keys.

Figure 3:
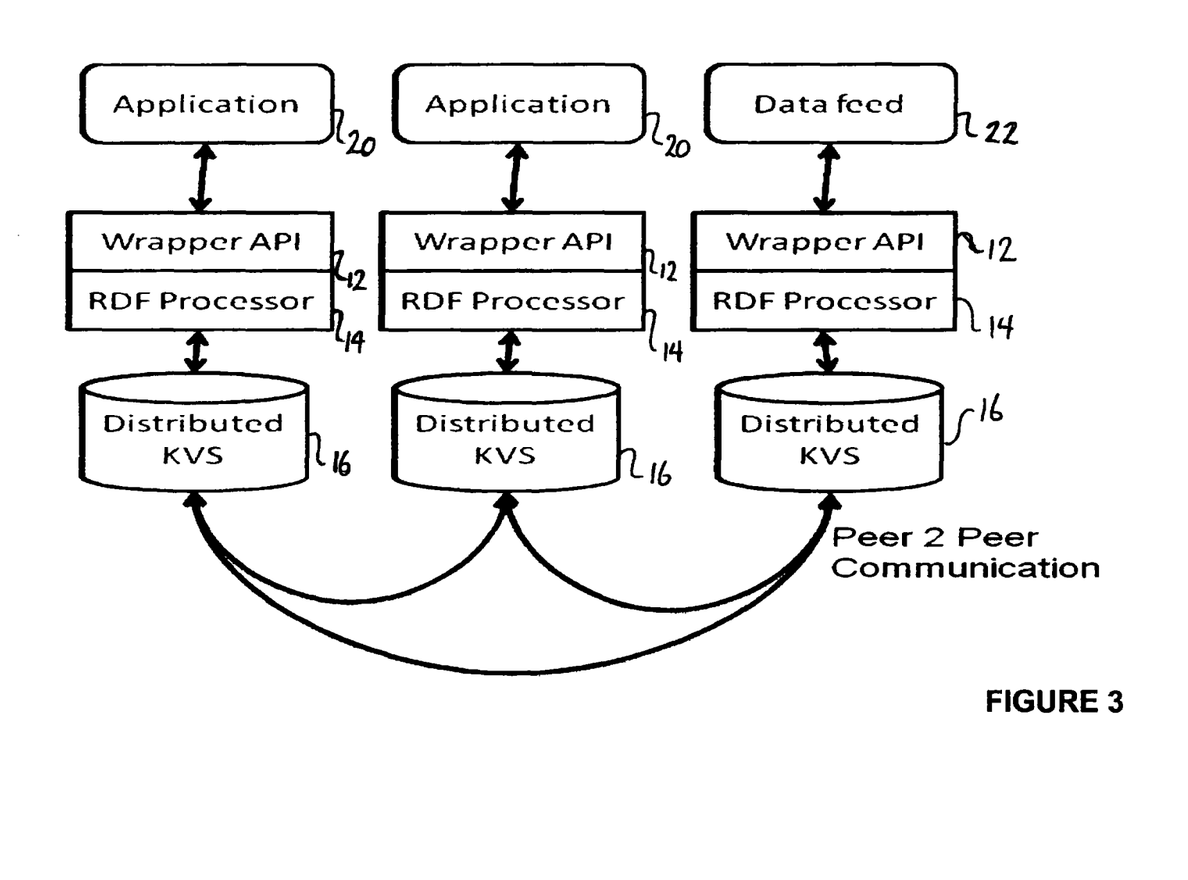
FIG. 3 is an alternative representation of a system architecture implementing an embodiment of the present invention.

FIG. 3 is an alternative representation of a system architecture implementing an embodiment of the present invention. In FIG. 3, each column of processes may represent the processes being run on a particular machine or network node 10. Alternatively, it may that, for example, the applications 20 and/or data feed 22 are remote processes which have been allocated data connections to the network nodes 10 running the wrapper API 12, RDF processor 14, and distributed KVS 16 processes for the purposes of accessing the database. The particular machine running the processes may be a network node in an embodiment such as that illustrated in FIG. 1. Alternatively, the network nodes 10 may be equivalent to the distributed KVS processes 16 of FIG. 3, depending on the implementation details.

The individual processes are examples of those discussed in relation to FIG. 2, hence detailed descriptions of each process will be omitted here. The data feed 22 is an example of a particular type of application, in this case an application which is writing data to the database, for example, via "put" commands. The arrows represent data connections for interactions between processes. It can be seen that the distributed KVS processes interact with another so that a range query received at a particular node can be split into sub-range queries according to the mapping function and the sub-range queries sent to other distributed KVS processes.

In the architecture of FIG. 3, each RDF processor 14 is configured to communicate with a network node of the distributed ordered KVS 16 (which is exemplary of a network node 10 of FIG. 1).

The encoding mechanism for storing triples as data items or keys described in this document ensures that, in KVS embodiments, all the data is stored in the Key of a Key/Value store. In such embodiments, the Value is therefore available to store information facilitating a richer graph database. Some examples of data that can be stored in the Value, along with some implementation examples will now be described.

A key/value store maps keys to values, allowing storage (in the value field) of information related to the associated key, or specifically, to the triple encoded or stored in that key. Embodiments of the present invention which keep all the graph information in the keys allow fast range searches in the graph data and the potential to store additional semantic data in the value field, thus enhancing the functionality of the database. For example, embodiments may provide a richer graph database that is able not only to store graph data, but also to trigger events and maintain meta-data by using the Value of the KVS as an information and code container. Such a container may be implemented as a rich object that is configured to store (for example) meta-data information related to the associated triple and/or lists of triggers (i.e. software code, or references to software code stored elsewhere in the server) that execute a task when something is changed in the triple. A rich object in this context includes an object that can contain several data items represented in different ways, and code that can run on the machine where it is stored.

In an exemplary embodiment, each key of the KVS (which is an RDF triple) is mapped to an object of type container. Amongst other data, the Container object can store the following information:

Raw data. It maintains application-dependent data that is viewed and treated in the KVS as an opaque object. An opaque object in this context includes an object of a non-defined, unknown class. A programmer may produce code to handle such an object without knowing its type or class. For this purpose, the Container object may offer an API to set and get the application-dependent information.

Triggers. Applications can register call back functions that are used to asynchronously notify interested applications about specific events, namely when the RDF triple is changed and/or when it is deleted. For this purpose, a Container object may be configured to maintain a list of call back functions for each event ("inserted", "read", "updated" and/or "deleted") and an API to allow applications to register and unregister such call back functions. The application is free to register or unregister call back functions for any or all types of event, and also to select distinct functions for each event (which functions and events may be specified in the API). For example, the function for the "inserted" event is registered in the moment of the insertion.

A first implementation example of an embodiment of the present invention will be described in which graph data, that is the RDF triple itself, which is stored as the key of a key-value pair, is supplemented by meta-data relating to the RDF triple. The meta-data is stored in the value field of the value store corresponding to the key representing the RDF triple in question. In prior art systems, meta-data may have been stored by extending RDF triples into quads, which is not scalable and is hence undesirable.

The database in this first implementation example in question is a database storing imported RDF triples. Applications accessing the stored data may require information about the source from which the RDF triple was imported, for example, an identification of the source. In fact, embodiments of the present invention lend themselves to implementations in which datasets are exchanged between repositories and complex knowledge bases are published. In this first implementation example, each part of each triple is represented using a relative URI, with the original data source also identified as context information that needs to be stored among each RDF triple.

The container forming the value of the key-value pair has a raw data field in which the additional information (identification of the original data source) is stored. For each triple inserted into the database, the original data source URL is inserted into the container, which is set as a value in the KVS.

Thereafter, when an application accessing the data stored in the database of this embodiment requires context information about a triple, it can simply issue a get command for the container in the value field corresponding to the triple in question and read the raw data field.

A second implementation example of an embodiment of the present invention will now be described in which the value of a key value pair is a Container object (a collection of data stored together at a particular address, or accessible via a particular address associated with the Container), and that Container stores call back functions associated with the triple encoded in the key of the key-value pair. In this second implementation example, the contents of the Container are used for cache management purposes.

In a distributed system, caching is an established technique for improving system performance. Storing copies of remote data in a local cache can serve to reduce the amount of communication required between members of the distributed system. In a graph database embodying the present invention, each process in the peer-to-peer network maintains only a part of the graph. Hence, each process may maintain a local cache of remote triples, stored elsewhere in the peer-to-peer network. For example, it may be that a process will cache a remote triple when it is accessing the primary version of the remote triple at or above a predetermined frequency, and hence a copy of the triple is stored in a local cache. Alternatively, it may be that there are certain triples being accessed at or above a predetermined frequency and hence each process is configured to maintain a copy of that triple in a local cache. Caching local copies of a remote triple obviates the need to make frequent communication with a remote process to access (read) the content of the primary version of the remote triple.

An implementation having such a cache management system is preferably provided with a mechanism to invalidate or update its local cache when the primary version of a triple (that is copied in the local cache) is changed or deleted. Call back functions are stored in the Container of the primary version of the triple that is cached. For example, the client application responsible for making queries which result in one process accessing the remote triple and hence making a cached copy thereof may register a call back function with the primary version of the remote triple, by which call back function the process storing the cached copy is asynchronously notified when the primary version of the triple is deleted or changed. A call back function is a function that is registered to be called when a particular event happens. The function is configured to perform certain functionality, such as a notification or data modification, when called in response to the particular event. The precise form of the call back function is implementation specific, but it could be a block of code that is executed when called.

An exemplary mechanism for updating or invalidating a local cache is the provision of two distinct call back functions (or call back methods): i) the update( ) function, and ii) the delete( ) function. Function i) is operable to update the local cache with the new values of the primary version of the triple when the update( )function is registered on the "changed" event in the Container. The argument of either function may be, for example, an identifier of the cached copy of the triple. Function (ii) is operable to delete a cached copy of a triple when the primary version of the triple is deleted. The delete( ) function may be registered on the "deleted" event in the Container.

A third implementation example of an embodiment of the present invention will now be described in which a graph database embodying the present invention is used for the federation of more than one relational database.

Advantageously, representing data as a graph (in a graph database) enables the schema of the database to be changed more easily. The schema of the database in this context includes the structure of the database described in formal language. Changing the schema of a relational database requires a lot of administrative work including programming modifications. For example, both the format of the data and the applications that access the data need to be modified. Contrarily, in embodiments of the present invention, the database schema of the graph database is simply the data itself. Hence changing the schema is as simple as changing the data.

In this database federation implementation example, databases with different data and different schemas are correlated using a graph database embodying the present invention.

Figure 4:
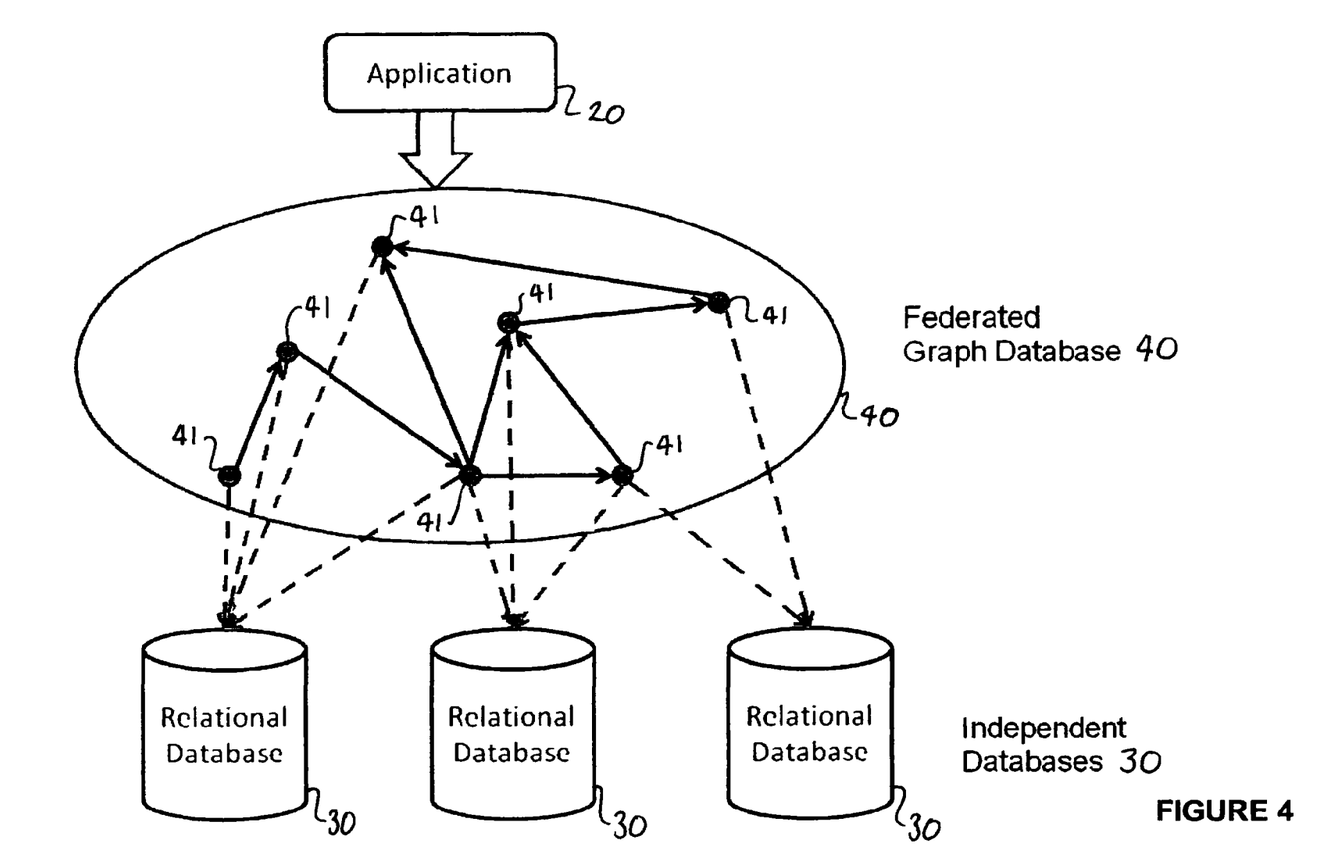
FIG. 4 is an illustration of how a graph database embodying the present invention may be used in database federation implementations.

FIG. 4 illustrates a set of independent relational databases 30, and the representation of data from those databases in a graph database 40, which is accessible by an application 20. Each graph node 41 represents a data item from the databases 30. The link between a graph node 41 and the database 30 storing the data item it represents is illustrated by a dashed line in FIG. 4. Some data items are shared between databases. For example, a particular entity, such as a person, may be represented in two independent databases. By adding information representing the identity of the entity (for example, using the "owl:sameAs" RDF notation) into the graph, that entity, previously represented by independent data items in separate databases, can be stored as a single graph node. Such a graph node represents a "shared" data item. The graph edges, illustrated as solid lines, represent relationships between data items.

Similarly to the second implementation example, in this third implementation example the value of a key value pair is a Container object. However, the Container objects in this example each store one or more of the following pieces of information about a triple:
 a list of the relational databases that contain information represented by the triple;
 for each of those databases, a connector specific to that database, which is used to update the information contained in that triple;
 a trigger to update other related graph items.

A connector may be implemented as, for example, a software library that is able to communicate with external data sources. As an example, a JDBC driver is a connector to a relational database. In this context, a connector may also be configured to convert data from the format used in an external source to a triple, and vice-versa.

Using the information stored in the Containers, and the associated software libraries, the database 40 is operable to update the data of the relational databases 30 in two ways.

Figure 5:
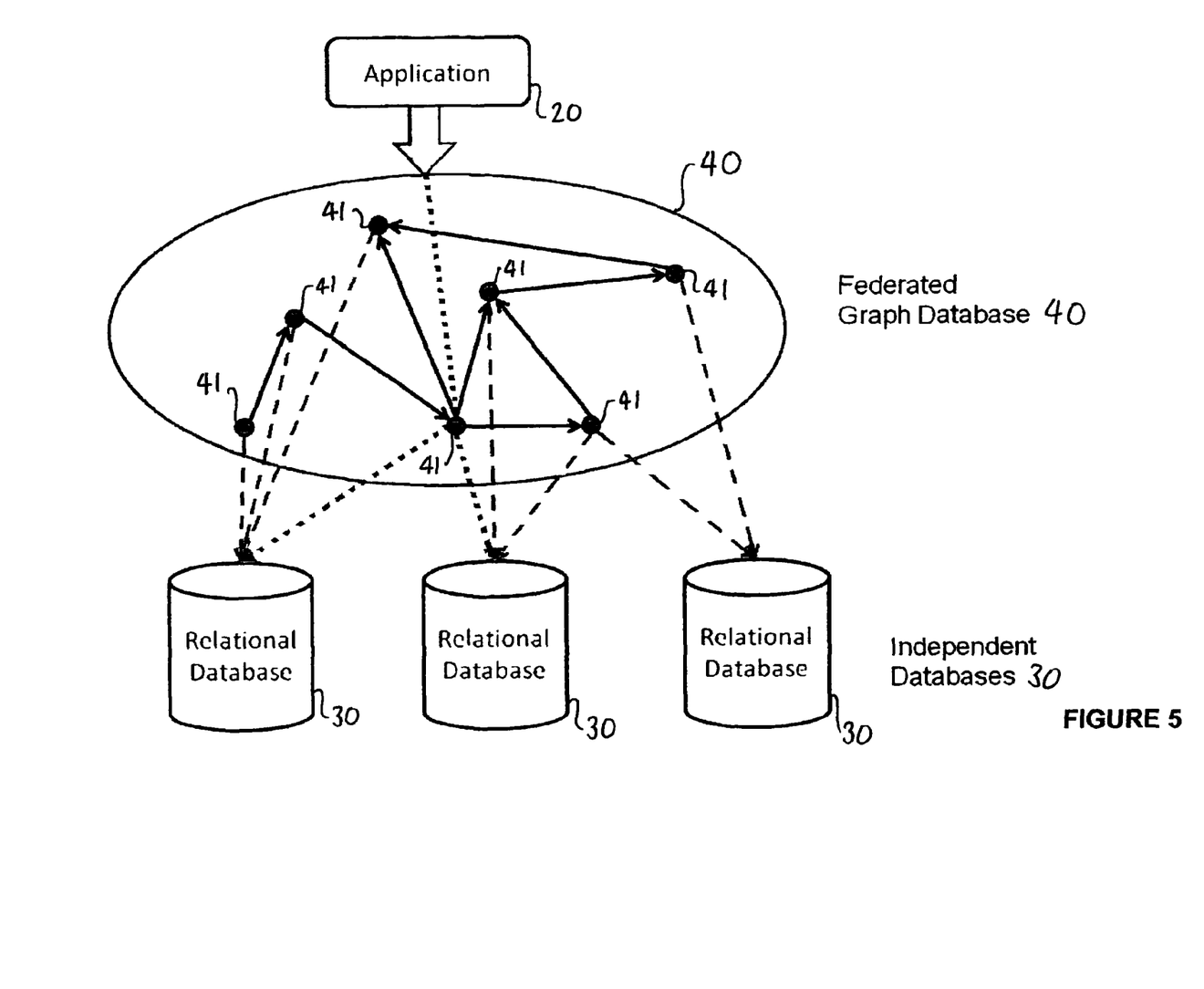
FIG. 5 is an illustration of a first example of how a graph database embodying the present invention may be employed to carry out database updates in database federation implementations.

Firstly, an application can be produced that is configured to query and update the graph 40 directly, and for the updates to be reflected in the relational databases 30. This is illustrated in FIG. 5. FIG. 5 illustrates the system of FIG. 4, with additional dotted lines. The dotted lines represent updates. Hence, the client application 20 is configured to update the graph data 40 directly, and carries out an update which changes a particular node 41 in the graph 40. Information represented by the updated node is stored in two databases, hence the dotted lines linking the updated node 41 to relational databases 30 illustrate the updates of those relational databases 30. In detail, one or more triples representing information about the updated node 41 are updated. The Container or Containers linked to those triples in the KVS contain a list of databases that need to be updated to reflect a change in the triple, and a connector for carrying out that update.

Figure 6:
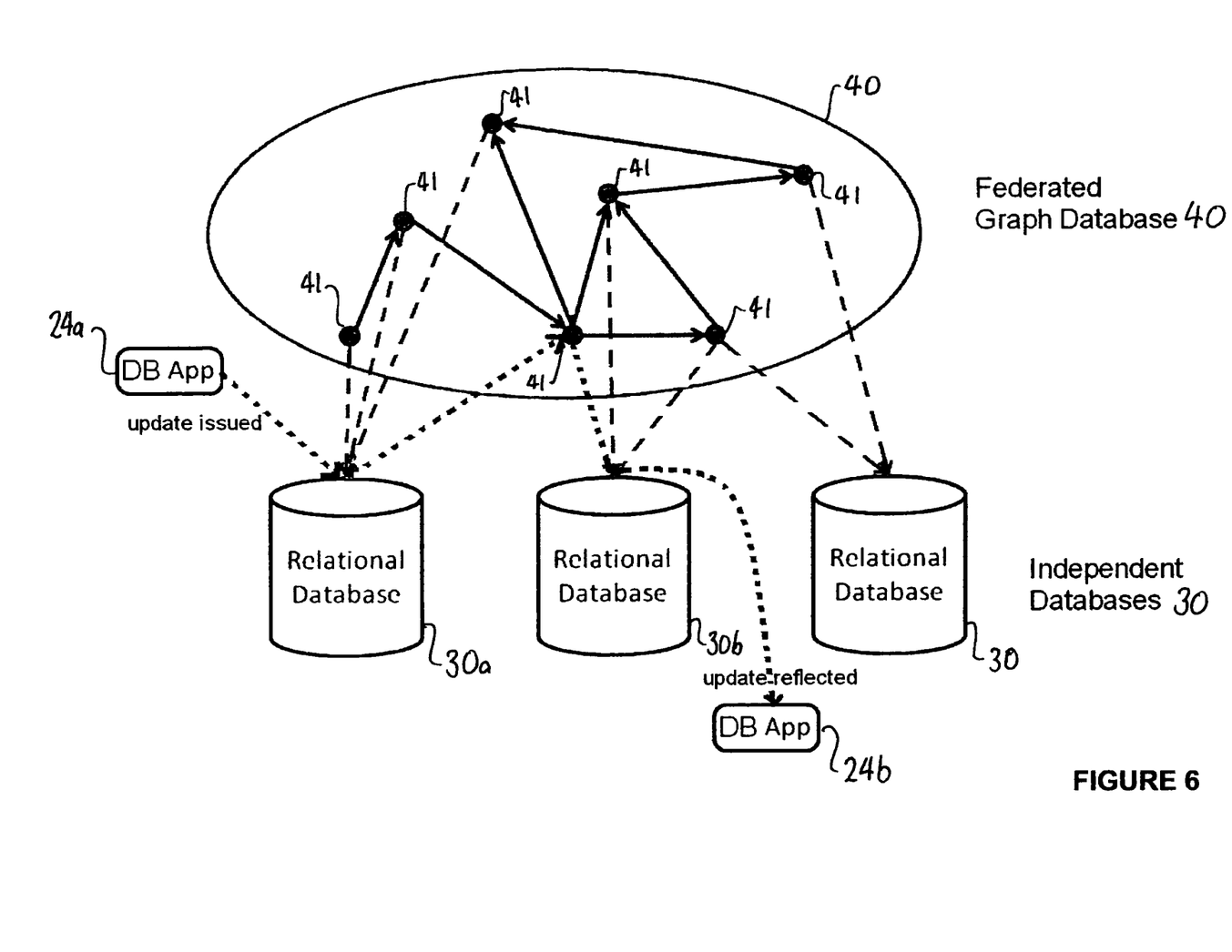
FIG. 6 is an illustration of a second example of how a graph database embodying the present invention may be employed to carry out database updates in database federation implementations.

The second way in which the data of the relational databases can be updated using the graph data and the information stored in the Containers is illustrated in FIG. 6. In FIG. 6, the graph database 40 is implemented as an intermediate between different relational databases 30. For example, storing a list of databases 30 in a Container linked to a triple in the KVS store, makes it implicit that a resource described by that triple is stored in more than one relational database 30, and hence the list contains information reflecting the "X owl:sameAs Y" information. Hence, if a database application 24a updates a data item in a particular database 30a (updates being illustrated by dotted lines, and in this instance the update is accompanied by the annotation "update issued"), this update is reflected in the graph, which uses connectors (call back functions) stored in the Containers to execute the same updates to the same data in the other relational database 30b in which it is stored. Hence, an independent database application 24b accessing an independent relational database 30b will reflect the update of the data issued by database application 24a.

A connector is an example of a call back function. Call back functions and exemplary mechanisms by which they can be provided will now be discussed in more detail. In the above second and third implementation examples, and generally in embodiments of the present invention, a software package can register a call back function to 'listen' for particular operations or events occurring in the data storage system. The following is an example of how such a call back function can be realised in invention embodiments. For example, the operations that a call back function can be used to provide notification and details of include a read access being made to a triple, a write access being made to a triple, creation of a new triple, and/or deletion of a triple. The software package runs in the server in which the call back function is registered. Whenever an operation is performed (read/write/create/delete) on a triple, the storage system is configured to check the Container associated with that triple for call back functions. If there is a call back function registered for that particular operation or event that occurred, the function is executed. The precise nature of the function and the resources it requires are implementation-dependent, and may be defined by the programmer of the function. In some implementations, it may be that communication with the RDF processor 14 is required in order to give feedback to a client application 20. In such examples, referring to FIG. 3, the communication channel between the RDF processor 14 and the KVS server 16 would be bi-directional. The RDF processor 14 will forward the feedback to the API wrapper 12, and on to the client application 20. A connection to external software could also be maintained.

A trigger event is an example of a call back function. A Container might store a list of other triples that should be updated if the associated triple is changed. A method stored as "updateTriple" in the KVS server 16 storing the updated triple is called upon triple being updated. The KVS store 16 checks where the other triples are stored, removes them, and inserts a new, updated versions of the triples. Updating a triple by deletion and re-insertion is preferable because it facilitates re-ordering of the stored data items (triples). The new version may even be stored on a different server.

In any of the above aspects, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The invention claimed is:

1. A network of computers storing a database of graph data encoded as triples, each comprising three triple elements: a subject; a predicate; and an object; and each stored within a data item among a set of data items ordered according to their data and distributed across a plurality of nodes of a distributed network of nodes; wherein
   each of the data items is a key of a key-value pair within a key-value system and the value of each of the plurality of key-value pairs includes additional information related to the triple stored within the key;
   the additional information includes a list of applications registered to receive a notification when a read and/or write access is made to the triple stored within the key-value pair; and
   each triple is stored in three data items each having a different configuration from among the following:
   a first configuration in which the subject precedes the predicate and the object in the data item;
   a second configuration in which the predicate precedes the subject and the object in the data item; and
   a third configuration in which the object precedes the subject and the predicate in the data item;
   wherein
   the node to which each of the data items is mapped is dependent upon the triple element that appears first in the data item, and then upon the position of the data item within the ordered set;
   the network of computers comprises an interface configured to receive range queries fixing a range of one of the three triple elements, and to respond to the query by retrieving data items having a value of the one of the three triple elements in the fixed range from only those nodes to which data items in which the one triple element precedes the other triple elements are mapped.

2. A database according to claim 1, wherein each of the data items includes a string object comprising the subject, the predicate, and the object of the corresponding triple.

3. A database according to claim 2, wherein the data items are ordered according to alphabetical comparisons of the string objects.

4. A database according to claim 1, wherein the additional information is data made available to an application accessing the database in dependence upon the identity of the application.

5. A database according to claim 1, wherein the value of each key-value pair includes an application programming interface, API, enabling an application to register and/or unregister for said notifications.

6. A database according to claim 5, wherein the value of each key-value pair includes an application programming interface, API, governing access to the additional information.

7. A database according to claim 6, wherein the additional information includes software code for execution by the node on which the value is stored.

8. A database according to claim 7, wherein each of the data items is mapped to a node using an ordered hash table.

9. A database according to claim 8, wherein the ordered hash table uses a consistent hashing function.

10. A database according to claim 9, wherein the database is accessible by one or more other databases; and
    the additional information includes:
    a list of databases among the one or more other databases that contain information represented by the triple stored within the key-value pair;
    for each of the listed databases, a connector that allows the information contained in the triple stored within the key-value pair to be updated by an application operating on that listed database.

11. A computing apparatus configured to function as a node within a distributed network of computers, the computing apparatus storing a subset of a database of graph data encoded as triples, each comprising three triple elements; a subject; a predicate; and an object; and each stored within a data item among a set of data items ordered according to their data and distributed across a plurality of nodes of the distributed network of nodes; wherein
    each of the data items is a key of a key-value pair within a key-value system and the value of each of the plurality of key-value pairs includes additional information related to the triple stored within the key;
    the additional information includes a list of applications registered to receive a notification when a read and/or write access is made to the triple stored within the key-value pair; and
    each triple is stored in three data items each having a different configuration from among the following:
    a first configuration in which the subject precedes the predicate and the object in the data item;
    a second configuration in which the predicate precedes the subject and the object in the data item; and
    a third configuration in which the object precedes the subject and the predicate in the data item;
    wherein
    the node to which each of the data items is mapped is dependent upon the triple element that appears first in the data item, and then upon the position of the data item within the ordered set;
    the computing apparatus comprises an interface configured to receive range queries fixing a range of one of the three triple elements, and to respond to the query by searching only those data items in which the triple element fixed by the range query precedes the other triple elements.

12. A computer program which, when executed by a computing apparatus, causes the computing apparatus to function as the computing apparatus defined in claim 11.

* * * * *